June 4, 1957 W. A. SHANLEY 2,794,433
TOOL AND WORK HOLDING APPARATUS
Filed March 6, 1953 6 Sheets-Sheet 3
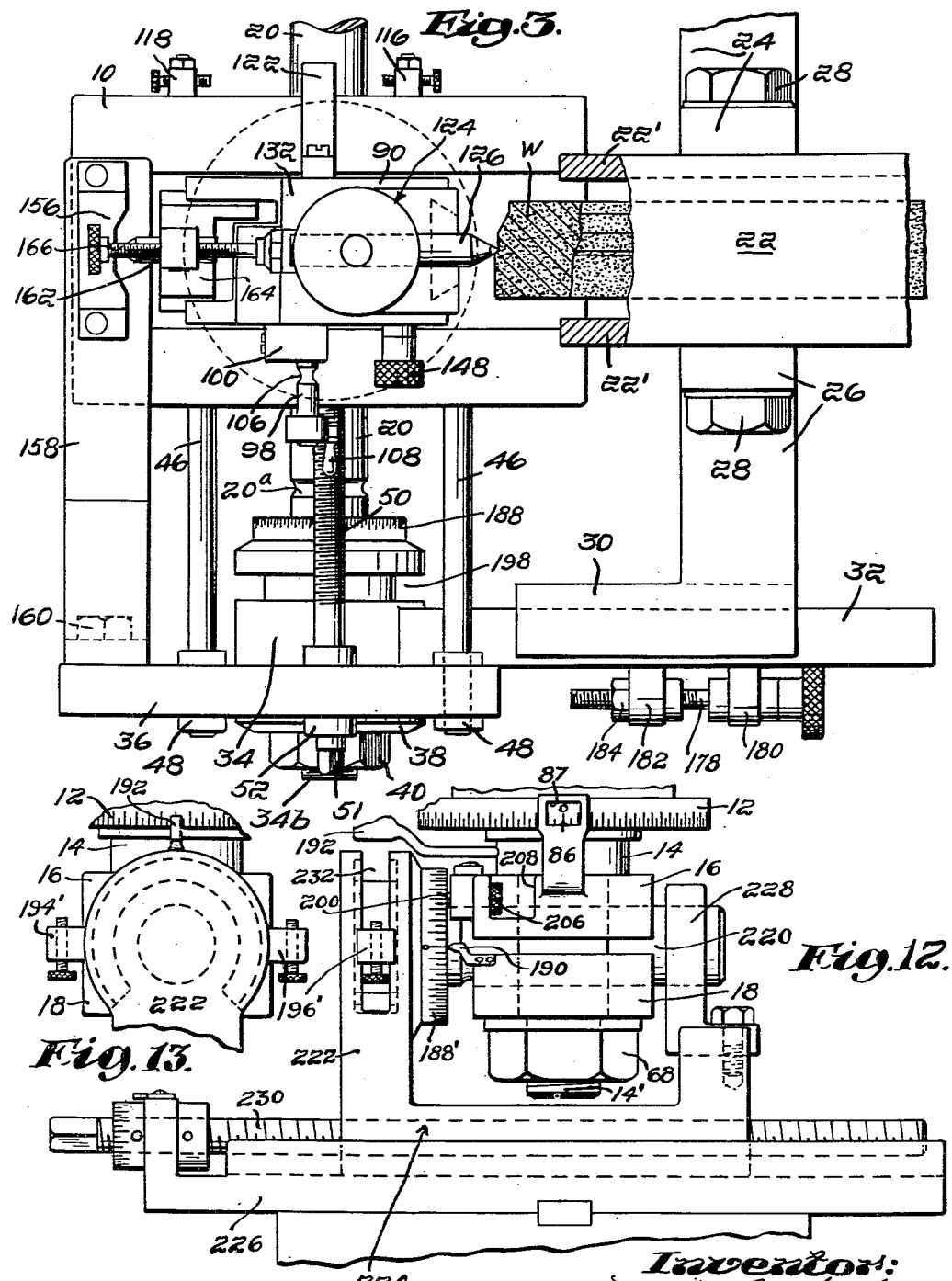

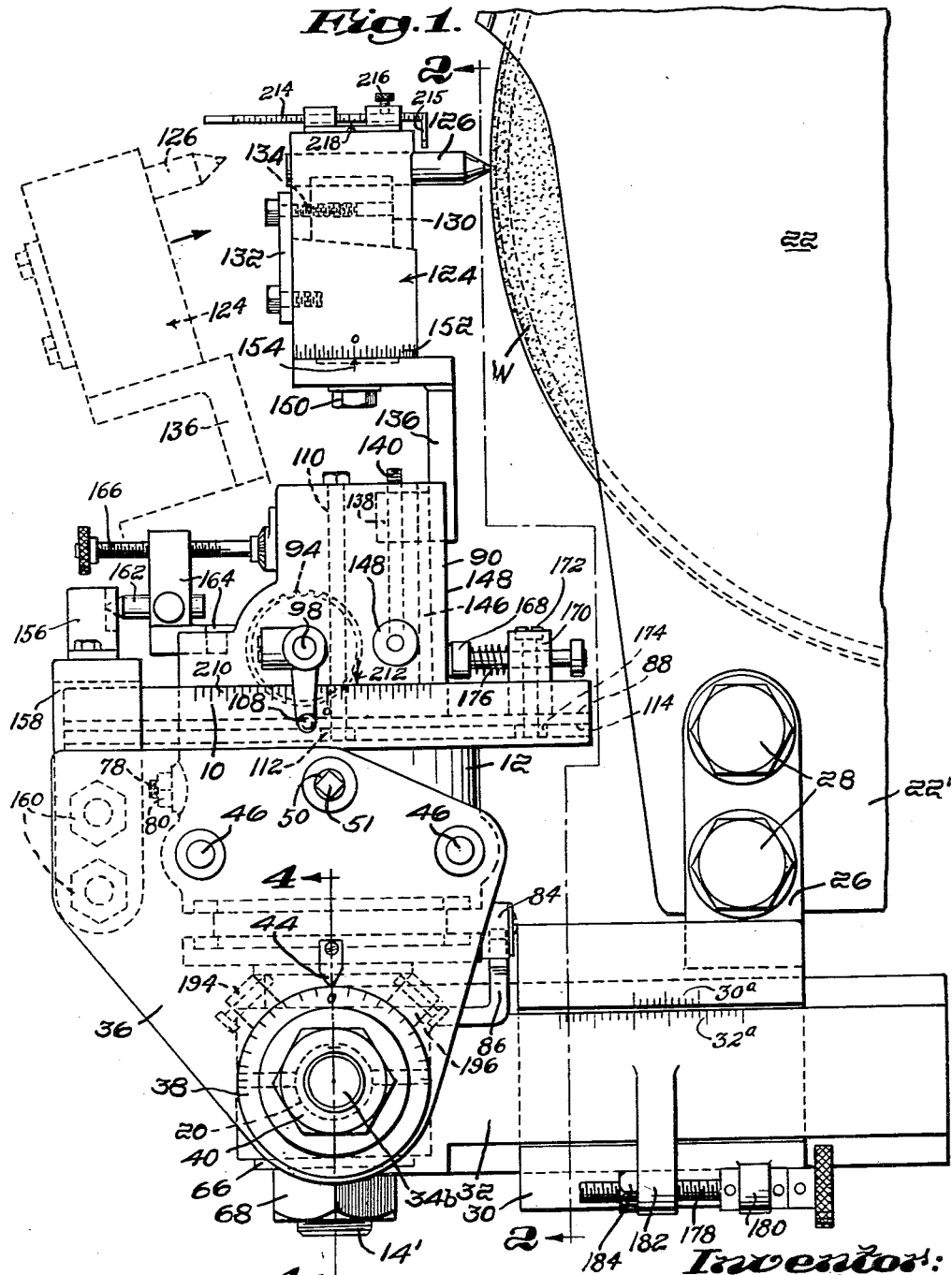

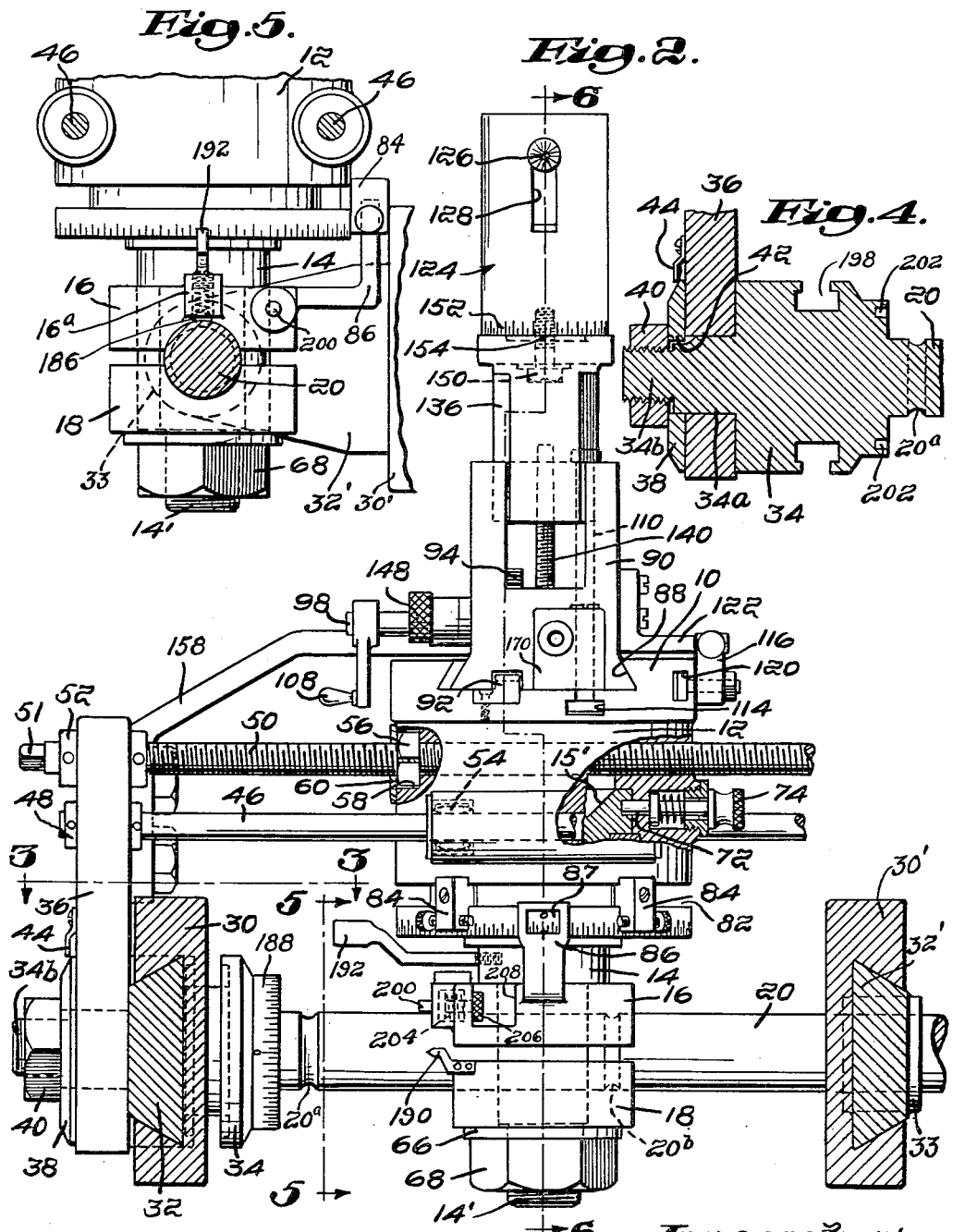

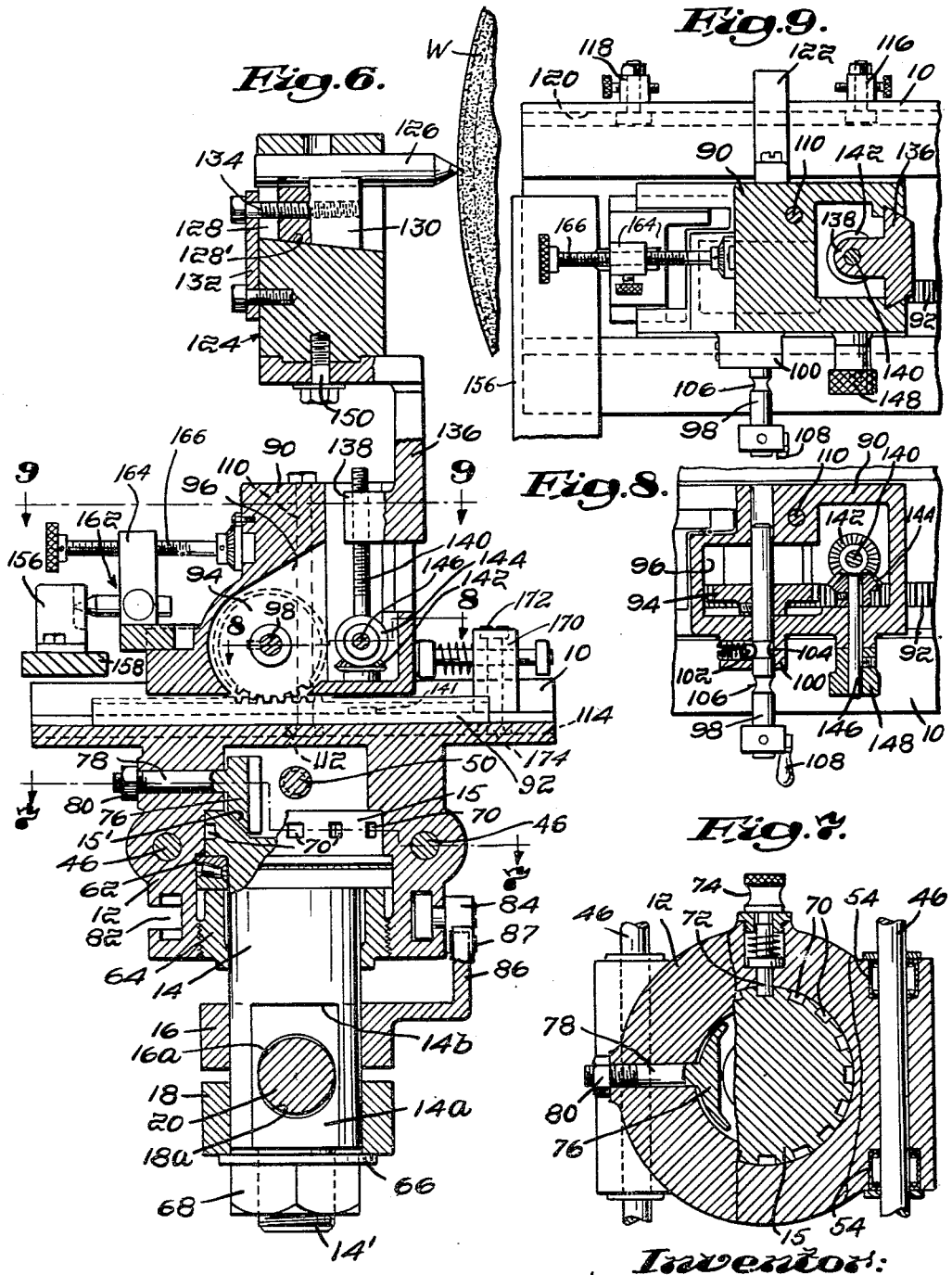

June 4, 1957 W. A. SHANLEY 2,794,433
TOOL AND WORK HOLDING APPARATUS
Filed March 6, 1953 6 Sheets-Sheet 5
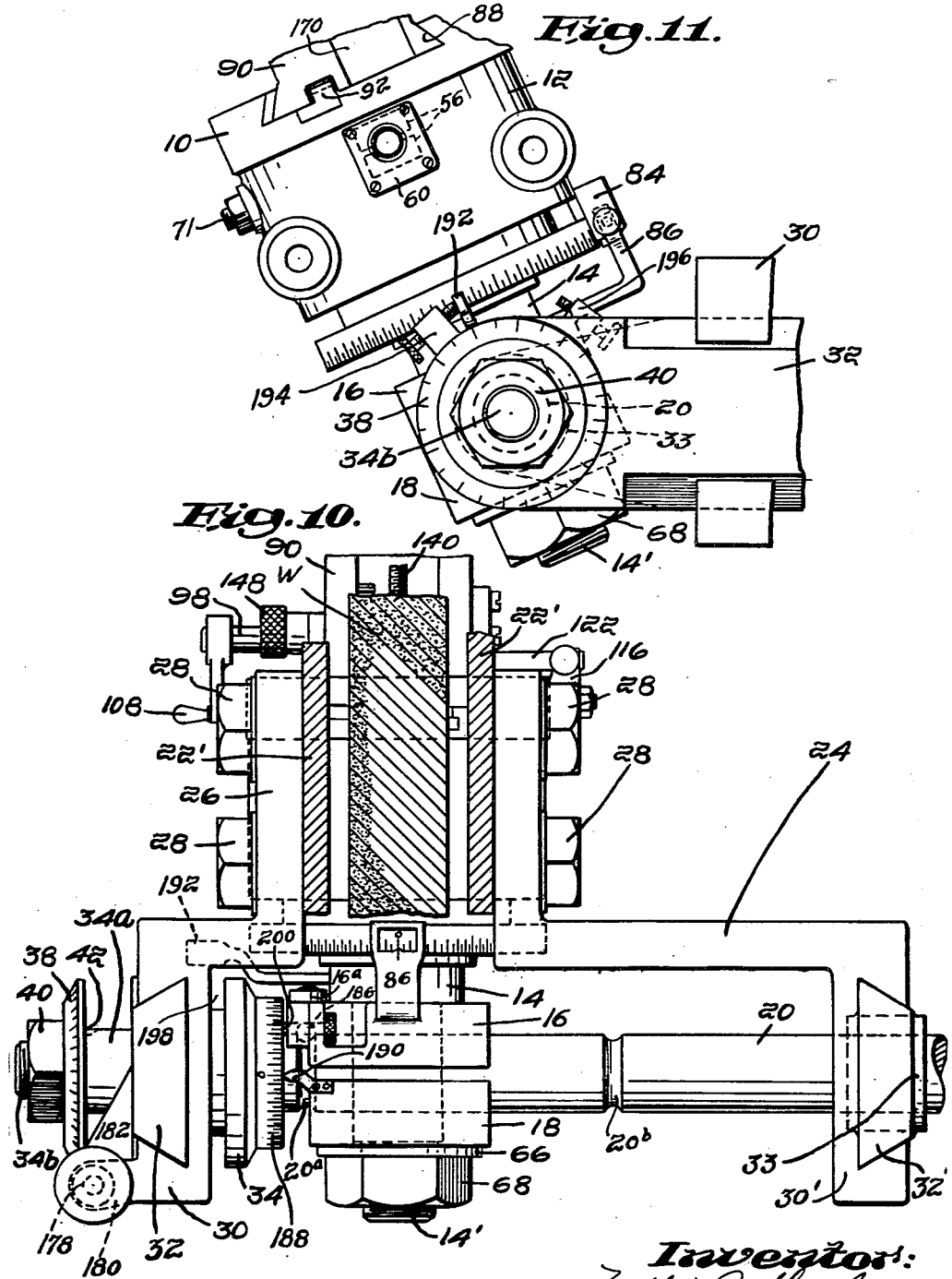

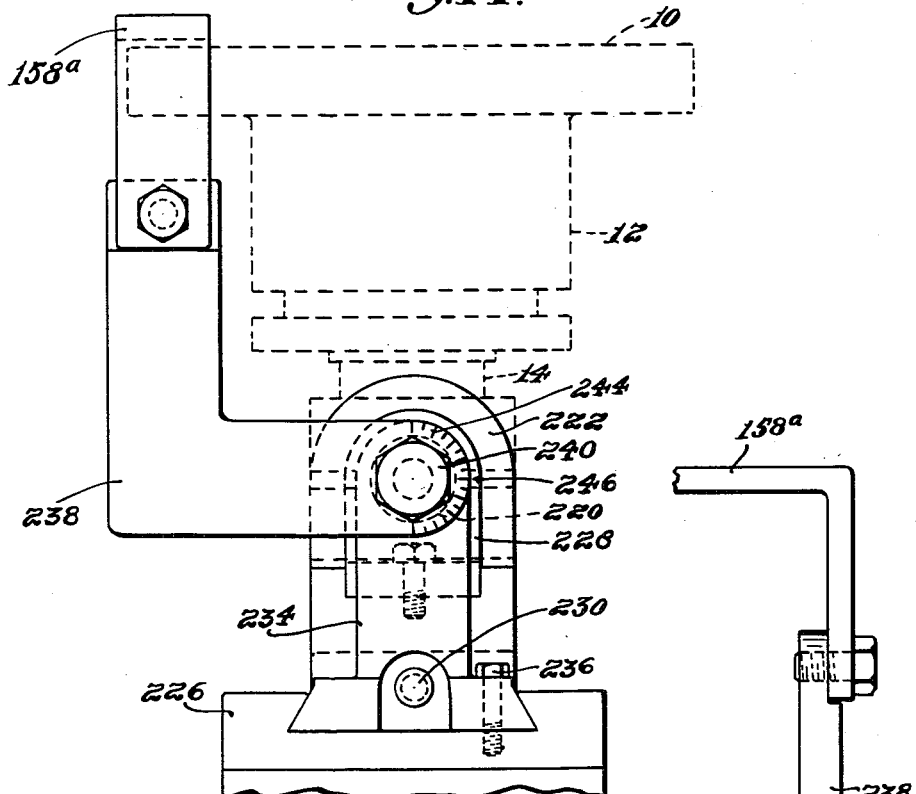
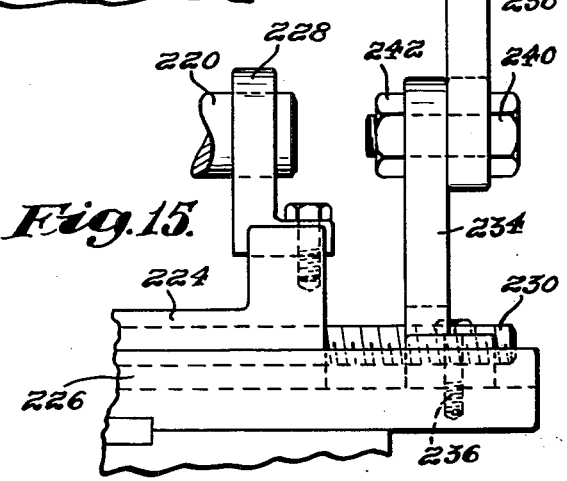

United States Patent Office 2,794,433
Patented June 4, 1957

2,794,433

TOOL AND WORK HOLDING APPARATUS

Walter A. Shanley, Boston, Mass.

Application March 6, 1953, Serial No. 340,708

12 Claims. (Cl. 125—11)

This invention relates to improvements in apparatus for adjustably supporting work or tools while an operation is performed on the supported work or by a supported tool. More particularly it provides such an apparatus having universality of capabilities beyond the scope of any prior comparable apparatus or mechanism of which I am aware. The invention is herein disclosed as it may be embodied as a part of or as an attachment for any conventional variety of grinding machine, and as it may be embodied in a separate apparatus adapted to be mounted on a suitable support in operative relation to the wheel of a grinding machine, for generating and duplicating both simple and complex wheel contours which may include convex or concave curvatures or combinations of such curvatures with angular and plane surfaces. It should be understood, however, that my improved apparatus may support tools of various descriptions in any of various relationships to independently supported work and may support work of various descriptions in any of numerous relationships to an independently mounted tool, or the like.

Hence, it is among the objects of the invention to provide an apparatus for supporting either work or a tool wherein the supported object may be variously positioned about each of two right-angularly related axes, and may be adjusted in directions along each of the said axes and in any direction radially of one of the said axes. According to the invention, my improved apparatus has a slide for supporting work or a tool, the slide being movable along a table and the table being swingable through 360° about one axis and rotatable through 360° about an axis perpendicular to the plane of the table and to said one axis, and the said perpendicular axis being adjustable along said one axis.

Another object of the invention is to provide an apparatus which may support a tool for forming or truing a grinding wheel or the like and which is readily convertible from an apparatus capable of generating and duplicating wheel contours in conformity with a templet to an all-purpose wheel-truing and wheel-forming apparatus wherein the tool is adjustably mounted on a table which is swingable to any of numerous positions of adjustment about one axis and rotatable to any of numerous positions about a second axis generally at right angles to said one axis, and is adjustable in directions along the said one axis.

Yet another object is to provide an apparatus which is adapted to support either work or a tool and which, as a tool support, may support a grinding wheel truing or forming tool on a table which is adjustably swingable about one axis and rotatable about a second axis at right angles to said one axis, with the said tool adjustable along the table to stand to one side or the other of said second axis, whereby similar partial rotations of the table about said second axis will travel the tool across the periphery of a wheel to produce a convex contour, in the one case, and a concave contour, in the other case.

A further object of my invention is to provide a work or tool support wherein the supported object may be set in any angular position around each of two right-angularly related axes, and may be adjusted along one of said axes and along any radius of the other of said axes at either of opposite sides of the latter axis.

Still another object of the invention is to provide a grinding wheel truing and forming apparatus whose tool may be set in any angular position around each of two right-angularly related axes, and may be moved along one of said axes and along any radius of the other of said axes, with calibrating means facilitating selective settings of the tool in selected angular positions about each of said axes.

It is, moreover, my purpose and object generally to improve the structure and operative efficiency and capabilities of work or tool supporting apparatus, and more especially to provide such an apparatus having a working scope beyond the capabilities of any comparable apparatus of which I am aware.

In the accompanying drawings:

Fig. 1 is a side elevation of a grinding wheel truing and forming apparatus embodying features of my invention, the apparatus being in the process of forming a grinding wheel contour in conformity with a templet;

Fig. 2 is an end elevation of the apparatus of Fig. 1, looking at that end which is toward the grinding wheel in Fig. 1, portions being in cross-section on line 2—2 of Fig. 1, and other portions being broken away to show interior parts;

Fig. 3 is a top plan view of the appartus of Figs. 1 and 2, portions of the grinding wheel and its guard being in cross-section;

Fig. 4 is a fragmentary cross-sectional view on line 4—4 of Fig. 1;

Fig. 5 is a cross-sectional view on line 5—5 of Fig. 2;

Fig. 6 is an elevational view mostly in cross-section on line 6—6 of Fig. 2;

Fig. 7 is a cross-sectional view approximately on line 7—7 of Fig. 6;

Fig. 8 is a cross-sectional view approximately on line 8—8 of Fig. 6;

Fig. 9 is a cross-sectional view on line 9—9 of Fig. 6;

Fig. 10 is an end elevation generally similar to Fig. 2 but showing the apparatus with the fixtures for templet-forming removed;

Fig. 11 is a side elevation of the apparatus of Fig. 10 with the tool-supporting table in an angularly adjusted position around its supporting shaft;

Fig. 12 is an elevational view showing a modification in which the swingable portions of the apparatus of the earlier views are swingable about a relatively short shaft which is on a slide which is adjustable in directions parallel with the axis of the short shaft;

Fig. 13 is an end elevation of a portion of the apparatus of Fig. 12;

Fig. 14 is an end elevation looking at the right hand end of the apparatus of Fig. 12, with portions shown in dotted outline, but showing a templet supporting shelf adjustably mounted in the dove-tail groove of the fixed guide; and Fig. 15 is a fragmentary side elevation of the adjustable templet-supporting shelf of Fig. 14.

Referring to the drawings, and more particularly to Figs. 1–9 thereof, a table 10 has a generally cylindrical and integral depending bearing portion 12 rotatably mounted on an upstanding shaft 14 whose lower end portion has the two generally rectangular clamping members 16, 18 thereon by means of which the upstanding shaft 14 may be clamped to a generally horizontally disposed shaft 20 or, when the clamp is loosened, the clamping members 16, 18 support the upstanding shaft 14 for sliding movements along shaft 20 and for rotational movements about the axis of shaft 20. Shaft 20 may be supported in any suitable manner on a fixed part, or fixed parts, of a grinding machine, such as on the depending portions 22' of the grinding wheel guard 22 to which the shaft-supporting brackets 24, 26 are secured at 28. As best seen in Figs. 1, 3 and 10, wherein a grinding wheel is represented at W, the bracket 24 is secured to the guard portion 22' at one side of the guard and bracket 26 is secured to guard portion 22' at the opposite side of the guard. Bracket 26 extends downward from the adjacent guard portion 22' and terminates in a dove-tail guide 30 in which a slide member 32 is slidable in directions generally at right angles to the directions of extent of shaft 20. Bracket 24 extends horizontally (Fig. 10) from its region of securement at 28 and then downwardly and terminates in a dove-tail guide 30' similar to and parallel with guide 30. A slide 32' is mounted in guide 30' and has one end projecting from guide 30' toward shaft 20 and provided with a bearing part 33 for shaft 20.

One end portion of shaft 20, adjacent the guide 30, has formed thereon, or rigidly secured thereto, the bearing hub 34 which is best seen in Fig. 4, and the adjacent end of slide 32 is integral with, or rigidly secured to, bearing hub 34, as best seen in Fig. 3. The bearing hub 34 has the reduced outer portion 34$^a$ for reception of a relatively large plate 36 which may be removably secured on hub 34 by an indexing collar 38 which may be tightened against plate 36 by the nut 40 threaded on the reduced extreme end portion 34$^b$ of the hub. When nut 40 is loose, plate 36 can be rotated on hub part 34$^a$ but indexing collar 38 is slidably keyed at 42 against rotation on hub part 34$^a$. Collar 38 is marked with an annular indexing scale for coaction with the indicating pointer 44 fixed on the outer face of plate 36. Hence, by loosening of nut 40, the plate 36 may be rotated on hub 34 about the axis of shaft 20, with indicator 44 moving around the indexing scale of collar 38 to any desired position of adjustment of plate 36, and the plate may be secured in the selected position by tightening nut 40.

Plate 36, at upper regions thereof, has end portions of two guide rods 46 secured thereto as at 48, and has one end of a relatively long screw 50 rotatably secured thereto as at 52. The two guide rods 46 extend slidably and in spaced parallelism through the depending bearing portion 12 of table 10, suitable bearing units 54 (Fig. 7) preferably being provided in depending portion 12 for providing the main supports for the guide rods in order to reduce friction between the rods and bearing portion 12 beyond the units 54. This serves to facilitate relative sliding movements of the guide rods and depending portion 12 of table 10, and the guide rods may have length permitting substantial sliding movements of depending part 12 along the guide rods.

Screw 50 also extends through depending bearing part 12 of table 10, it being above and extending in parallelism with the guide rods 46. A removable split nut 56 (Fig. 2) is non-rotatably retained in a recess 58 in the outer wall of depending bearing part 12, it being held in place by the recess cover 60 which may be removed when the nut 56 is to be removed. Screw 50 extends through split nut 56 and is threadedly engaged therewith. The extreme end of screw 50, adjacent to plate 36, may be non-round as at 51 for reception of a handle, or the like, by means of which the screw may be rotated. Hence, as viewed in Fig. 2, the depending bearing portion 12 of table 10 and the plate 36 are secured against relative rotation by rods 46 and screw 50, but both may be rotated in unison about the axis of shaft 20 when the clamping members 16 and 18 are loose on shaft 20 and when nut 40 is loosened on the threaded end 34$^b$ of hub 34. Also, table 10 and its depending bearing portion 12 may be fed in either direction along shaft 20 by manual rotation of screw 50. In the latter case, nut 40 will be tightened but clamping members 16, 18 will be loose on shaft 20.

As best seen in Fig. 6, shaft 14 is a stub-shaft terminating at its upper end within the depending bearing portion 12 of table 10. The stub-shaft has the enlargement 15 at its upper end which provides an annular shoulder for resting against one raceway of a roller bearing unit 62 whose other raceway is engaged by the inner end of a retaining sleeve 64 screwed into the lower end of bearing portion 12. Shaft 14 projects a substantial distance beyond the lower end of bearing portion 12 and opposite sides of the shaft are cut-away to provide the flat areas 14$^a$ and the abutment shoulders 14$^b$. Horizontally disposed shaft 20 extends loosely through shaft 14 at the portion of shaft 14 having the flat areas 14$^a$, and the two clamping members 16, 18 are mounted on shaft 14 at opposite sides of shaft 20. The upper clamping member 16 has a hole therethrough cross-sectionally similar to the cross-section of shaft 14 at the location of the flat areas 14$^a$ and is non-rotatably mounted on shaft 14 with its upper portion seated against or adapted to seat against the abutment shoulders 14$^b$. The lower portion of member 16 is grooved at 16$^a$ for engaging around the upper portion of shaft 20. The lower clamping member 18 has a hole therethrough cross-sectionally similar to the cross-section of shaft 14 at the location of the flat areas 14$^a$ and is non-rotatably mounted on shaft 14 below shaft 20, with its upper portion grooved at 18$^a$ for engaging around the lower portion of shaft 20. A washer 66 and nut 68 on the reduced lower end 14' of shaft 14 are adapted to effect clamping of shaft 20 between the clamping members 16, 18 when nut 68 is tightened. When nut 68 is loosened the table 10 and its supporting shaft 14 may be moved along shaft 20, and may be swung about the axis of shaft 20 to any desired angular position and be secured therein by tightening nut 68.

The enlargement 15 on stub-shaft 14 has a series of index recesses 70 arranged annularly around its periphery, and a spring-pressed index pin 72 (Figs. 2 and 7) extends through the outer wall of depending portion 12 of table 10 for selective engagement in any one of the index recesses 70. The outer end of pin 72 has a knob 74 thereon to facilitate manual retraction of pin 72 when the table 10 is to be rotated about the axis of stub-shaft 14. Shaft enlargement 15 is interiorly recessed at its upper end to provide the inclined annular surface 15' (Fig. 6) with which a clamping block 76 coacts to securely clamp the depending part 12 of table 10 and stub-shaft 14 against relative rotation, in addition to the indexing engagement of pin 72 in a recess 70. Clamping block 76 is on the inner end of a threaded shank 78 which extends through the outer wall of depending portion 12 of table 10, with a nut 80 on the threaded outer end of the shank by means of which the block may be drawn into secure clamping engagement with the inclined surface 15'.

The lower end portion of depending part 12 of table 10 has a T-slot 82 extending all around it, and stop-members 84 may be secured at selective locations around slot 82 for coaction with an abutment element 86 extending upwardly from clamping member 16 to a location to be engaged by one or the other of the stop members 84 when table 10 is rotated about the axis of stub-shaft 14, assuming the plate 36 is absent, permitting such rotation of table 10. An annularly arranged scale on depending part 12 of table 10, adjacent to T-slot 82, facilitates predetermined setting of the stop members 84 along the T-slot 82. Abutment element 86 may have a hole 87 therein through which the markings of the scale may be seen (Figs. 2 and 6).

Table 10 has a dove-tail groove 88 in its upper surface, extending from end to end of the table, and a dove-tail slide 90 is engaged in groove 88 for sliding movements along the table. A gear rack 92 is secured to the table, and a gear 94 is rotatably mounted within a recess 96 in slide 90, and is adapted to be moved into and out of engagement with rack 92. Gear 94 is fixed on a shaft 98 which extends out of slide 90 through a bearing 100 within which a spring-backed ball 102 is constantly pressed into engagement with shaft 98 which has the two spaced annular grooves 104, 106 therein, as best seen in Fig. 8. When gear 94 is engaged with rack 92, the shaft 98 will be in its outermost position of Fig. 8, and ball 102 will be engaged in annular groove 104 of the shaft yieldingly maintaining the gear in rack engagement. By thrust of shaft 98 inward from its position of Fig. 8 until ball 102 engages in annular groove 106 of the shaft, gear 94 becomes disengaged from rack 92. The outer end of shaft 98 has a handle 108 thereon for rotating gear 94 and thereby feeding slide 90 along table 10, assuming gear 94 to be engaged with rack 92, and the slide may be secured in any selected position on table 10 by tightening of the long screw 110 which extends downward through the slide with its lower end threaded into a nut 112 which is adjustable along the longitudinal T-slot 114 in table 10. Two stop elements 116, 118 are adjustable along a second T-slot 120 at one side of table 10 and may coact with an abutment 122 fixed on the slide 90 to limit movements of the slide in either direction along the table 10.

A tool holder, indicated generally at 124, is mounted on slide 90 and is vertically adjustable thereon to raise and lower the tool 126 which may be removably and adjustably mounted in holder 124 in any suitable manner. As herein shown, and as best seen in Fig. 6, tool 126 extends through a slot 128 in holder 124 and the lower wall 128' of the slot is inclined. A clamping block 130 has an inclined bottom face for seating on wall 128' of the slot and has its upper face grooved for engaging around the under side of tool 126. Plate 132 is secured to holder 124 at the smaller end of slot 128, and a screw 134 extends loosely through plate 132 and is threaded into block 130. Hence, by tightening of screw 134, block 130 will be drawn toward the smaller end of slot 128 to securely clamp tool 126 against the upper wall of the slot.

Tool holder 124 is mounted on the upper end of a bracket 136 which is adjustable vertically in slide 90, it having the integral nut portion 138 thereon in which the vertical adjusting screw 140 is engaged. The lower end of screw 140 is rotatably secured at 141 to the slide 90, and a bevel gear 142 is fixed on screw 140 within the slide 90 and meshes with a similar bevel gear 144 fixed on horizontally disposed shaft 146 which extends out through a side wall of slide 90, with a knob 148 fixed on its outer end by means of which the tool holder 124 may be manually adjusted in vertical directions on slide 90. Preferably, the tool holder 124 is adjustable on bracket 136 for adjusting the position of tool 126 about the vertical axis of the tool holder. As shown in Fig. 6, the lower end of the tool holder is rotatably supported on bracket 136, with a screw 150 for securing the holder in adjusted positions on the bracket. Scale markings at 152 (Fig. 1) around the lower end of the tool holder facilitate desired settings of the tool 126 around the axis of the holder, in conjunction with the index mark 154 on bracket 136. The bracket 136 and the front wall of slide 90 may be suitably formed for guided sliding movements of the bracket in response to manual rotations of knob 148.

The apparatus with plate 36 thereon is primarily adapted for forming and truing grinding wheel surfaces and contours in conformity to a templet, and such a templet 156 is shown in Figs. 1, 3, 6 and 9 mounted on a shelf 158 which is secured at 160 to the plate 36. Shelf 158 extends upward from plate 36 and transversely of table 10, in spaced relation to the table. Templet 156 is secured to shelf 158 centrally between the opposite sides of the table in position to be engaged by a stylus 162 which is adjustably mounted on slide 90. As shown, the stylus is supported on the auxiliary slide 164 in slide 90 with screw 166 manually operable to adjust stylus 162 toward and from templet 156.

When the apparatus is to be used to form or true wheel contours from a templet, gear 94 will be pushed inward to disengage it from rack 92 so that slide 90 is free to be pushed along table 10, and a spring-biased plunger 168 constantly urges slide 90 yieldingly along table 10 in direction to maintain the stylus 162 in contact with templet 156. Plunger 168 is mounted on a support 170 which is adjustably secured at one end portion of dove-tail groove 88 in table 10 as by the screw 172 and nut 174, the latter being non-rotatably engaged in T-slot 114. A relatively strong coil spring 176 is coiled around the shaft of plunger 168 with one end of the spring engaging support 170 and the other end engaging the head end of the plunger.

As best seen in Figs. 1 and 3, the wheel W may be formed or trued in accordance with templet 156 as a result of feeding tool 126 across the periphery of the wheel by manual rotation of screw 50, and the tool may be variously adjusted to place it in proper relation to any selected radius of the grinding wheel W. The tool may be adjusted around the axis of shaft 20 by loosening of nuts 40 and 68. It may be adjusted toward and from table 10 by rotation of knob 148. Minute adjustments of the tool toward and from the wheel may be accomplished by manual rotation of screw 166 above the stylus 162. Also, if desired, the tool may be adjusted around the axis of bolt 150 by loosening of that bolt. Assuming that plate 36 is absent, table 10, of course, will be clamped against rotation on shaft 14 by having nut 80 tight on shank 78 of clamping member 76 (Fig. 6).

Excepting during the truing or forming to a templet, the plate 36 will be removed together with the rods 46, feed screw 50 and templet carrying shelf 158. This conditions table 10 for rotational adjustments about the axis of shaft 14 in addition to the adjustments previously mentioned. Hence, the table 10 may be swung through 90° from its position of Fig. 1, for example, to enable the tool carrying slide 90 to be fed transversely of the wheel periphery by means of handle 108 whose shaft 98 will be pulled outward to engage gear 94 with rack 92. The tool support 124, in such case, will be adjusted through 90° about the bolt 150. Spring-pressed plunger 168 will be moved to an out-of-the-way position on table 10, or may be removed from the table.

Referring more particularly to Figs. 1 and 3, it will be obvious that shaft 20 may be moved toward and from the vertical plane of the axis of wheel W by motion of the slides 32, 32' along the guides 30, 30'. Controlled movement of the slides 32, 32' may be accomplished by manual rotation of screw 178 which is rotatably anchored at 180 on guide 30 with its shank threadedly engaged with an ear 182 on slide 32. A lock nut 184 preferably is provided on the end portion of screw 178 for coaction with ear 182 in locking the slide 32 in any position along guide 30. Scale graduations at 30ª, 32ª may be provided on the guide and slide to facilitate predetermined settings of slide 32. Because slides 32, 32' are interconnected by shaft 20, the two slides tend to move in unison in response to rotation of screw 178. However, if found desirable or necessary, a feed screw, similar to the screw 178 may be provided on guide 30' for positively moving slide 32' as slide 32 is moved. It should be noted that adjustments of shaft 20 by movements of slides 32, 32' may be effected both when plate 36 and its appurtenances are in place and when they are absent.

Hence, when plate 36 and its appurtenances are in place, as in Fig. 1, the shaft 20 may be adjusted toward or from guide 30 by rotation of screw 178. Also, by loosening of nut 68 and nut 40, table 10 and the supported tool 126 may be swung about shaft 20 to a selected angular position, such as to the dotted position of the tool in Fig. 1, followed by tightening of the nuts 68, 40. As a result of such a swinging adjustment of the table and tool around shaft 20, the indicating pointer 44 on plate 36 will be carried around the calibrating scale on collar 38 to indicate the degrees of tilt from verticality of the axis of table supporting shaft 14. This angular adjustment about shaft 20 may be desirable for accommodating different sizes of grinding wheels. Also, it permits relatively quick movement of the tool and its support out of the way when room is needed, such as when a grinding wheel is being mounted on or removed from its supporting axle.

When plate 36 and its appurtenances are removed, as in Fig. 10, the nut 68 will be loosened so that the clamping members 16, 18 and shaft 14 may be moved along shaft 20 to its position of Fig. 10 wherein it is closely adjacent to hub portion 34 of shaft 20. Preferably, an annular groove 20ª in shaft 20 is located to receive a spring-pressed ball 186 in a projecting part 16' of clamping member 16, the ball and groove coacting to yieldingly maintain clamping members 16, 18 and shaft 14 in their positions on shaft 20 as illustrated in Fig. 10. One or more additional annular grooves may be provided at suitable locations along shaft 20, such as at 20ᵇ.

Inasmuch as the scale on collar 38 has no purpose when plate 36 is absent, the inner end of hub 34 has an annular scale 188 thereon for coaction with an indicating pointer 190 on clamping member 18 when the parts are in their relative positions of Fig. 10. Hence, when table 10 is swung about shaft 20 with the parts in their relative positions of Fig. 10, such as to the angular setting as shown in Fig. 11, the indicating pointer 190 is carried around scale 188 to indicate the degrees of tilt from verticality. Also, an abutment member 192 is fixed on shaft 14 and projects radially outward therefrom a substantial distance to a position for coaction with adjustable stop elements 194, 196 which may be adjustably mounted in the annular T-slot 198 in hub 34. The stop elements 194, 196 may be suitably set in T-slot 198, with abutment 192 between them, to stop a rotational movement of the table 10 about shaft 20 with the axis of shaft 14 inclined at a predetermined angle from verticality, with the abutment member 192 engaged against one or the other stop element, such as element 194 as shown in Fig. 11.

Preferably, a spring-pressed indexing pin 200 is mounted on clamping member 16 for engaging selectively in any one of an annular series of recesses 202 (Fig. 4) in the inner end of hub portion 34 of shaft 20, the pin 200 being constantly urged outward by spring 204 (Fig. 2) and having knob 206 thereon to facilitate manual retractions of the pin. Clamping part 16 may be recessed at 208 to accommodate knob 206. Hence, in the Figs. 10, 11 showing of the apparatus, indexing pin 200 may be engaged in any selected index recess 202 to set shaft 14 at any desired inclination around shaft 20, and indicator 190 will indicate on scale 188 of hub part 34 the particular setting. Ordinarily, the nut 68 will be tightened to clamp the parts in selected relationships.

With plate 36 and its appurtenances removed and with the parts in their relative positions of Fig. 10, the table 10 may be rotated about its supporting shaft 14 when clamp nut 80 is loosened, at which times the adjustable stops 84 may be set for coaction with the abutment 86 to predetermined limits of rotation of the table, with the indicating point at window 87 of the abutment indicating on the associated scale the angular setting of the table about shaft 14. The relations of stops 84, abutment 86, the indicating point in window 87 and the associated scale, are best seen in Fig. 2 although they serve no purpose when plate 36 is in place as it is in Fig. 2.

In Fig. 1, the table 10 is provided along one side with scale markings 210 for coaction with an indicator mark 212 on slide 90 to indicate positions of adjustment of slide 90 along the table and also to permit computation of the distance that the point of tool 126 is set outward from the axis of shaft 14 when an adjustable tool gage is in place on the tool holder 124 as represented at 214 in Fig. 1. Tool gage 214 may be a relatively long scale slidably and rotatably mounted in suitable bearings at the outer end of the tool holder 124, with a thumb nut 216 for securing it in any particular position. The end of the scale which is toward the point of tool 126 has the right-angularly offset part 215 which may be positioned opposite the point of the tool and the fixed indicating mark 218 will indicate on scale 214 the distance that the point is outward from the axis of tool holder 124. By addition of this reading to the amount that the tool holder axis is offset to the same side of the axis of shaft 14, as indicated on table scale 210, the total amount that the point of the tool is outward from the axis of shaft 14 may be readily determined. Of course, if the tool holder axis is offset to the opposite side of the axis of shaft 14, the table scale reading will be subtracted from the reading on gauge scale 214.

Figs. 12, 13 illustrate a modification in which the shaft 14 is mounted on a relatively short shaft 220 which is comparable to shaft 20 in the earlier embodiments of the invention. Shaft 220 may be integral with or fixed on the upstanding wall 222 of a slide 224 which is adjustable along a guide 226 in directions parallel to the axis of shaft 220 whose outer end may be supported in removable bearing bracket 228, on slide 224. A screw 230 may be manually rotated to move slide 224 in either direction along guide 226. Wall 222 may be provided with the arcuate T-slot 232 along which adjustable stops 194', 196' may be selectively positioned for coaction with the abutment 192. Also, wall 222 may have the annularly graduated scale 188' thereon, comparable to the scale 188 on hub part 34 of shaft 20, for coaction with indicator 190, and the projection which has scale 188' thereon may have indexing recesses therein (not shown), comparable with the index recesses 202 in hub part 34 of shaft 20, for selective reception of the indexing pin 200.

The apparatus of Figs. 12, 13 has all of the capabilities of the earlier described embodiments excepting the operations of forming and truing to a templet. However, this apparatus of Figs. 12, 13 may be quickly and effectively converted for templet-forming and templet-truing by mounting of a shelf-supporting member 234 in the dove-tail groove of its guide 226 as illustrated in Figs. 14 and 15. Member 234 straddles feed screw 230 and may be fixed in position on guide 226 in any suitable manner, as by the screw 236. An L-shaped bracket 238 is adjustably secured to the upper end of member 234 by a bolt 240 whose nut 242 may be tightened to clamp bracket 238 in selected positions of adjustment about the axis of bolt 240 whose axis coincides with the axis of shaft 220. The free end of bracket 238 has a templet-supporting shalft 158ª fixed thereon and adapted to extend transversely of table 10 in slightly spaced relation thereto, similar to the earlier described shelf 158 on plate 36. Hence, when table 10 is adjusted around the axis of shaft 220, shelf-supporting bracket 238 may be correspondingly adjusted about the axis of bolt 240. If desired, the clamped end of bracket 238 may be marked with degree graduations as at 244 to facilitate angular settings of the bracket in conjunction with an indication 246 on the member 234. It will be apparent from the foregoing description, in connection with the drawings, that I have provided a work or tool holder having universal capabilities for selective setting of work or a tool in any of numerous positions about each of two right-angularly related axes and for selective setting of the work or tool in any of numerous positions along one of the axes and along any radius of the other of the axes. As a work holder, the table 10 may have any suitable variety of work clamp adjustable therealong and, as a tool holder, the table slide 90 may hold any of numerous varieties of tools with permissible adjustments toward and from table 10 and around an axis perpendicular to the plane of table 10, additional to the described adjustments of slide 90 on table 10 and of table 10 about each of two right angularly related axes and along one of the latter said axes.

Modifications and changes from the illustrated structures may be made without departing from the spirit of the invention so long as such modified and changed structures fall within the scope of the accompanying claims, it being my intention to cover, by suitable expression in the claims, whatever features of patentable novelty exist in the invention disclosed.

I claim as my invention:

1. Apparatus for holding one object in any of numerous relationships to another object, comprising a table on which said one object may be mounted, means for adjustably supporting said one object on the table for selective setting of said one object along the table, a shaft disposed with its axis generally perpendicular to said table and having the table supported on an end portion thereof for rotational movements about the axis of said shaft, a second relatively long shaft having round cross-section disposed generally at right angles to the first mentioned shaft with the axes of the two said shafts constantly intersecting each other, clamping members mounted on one of said shafts and movable toward each other along said one of the shafts into clamping engagement with opposite sides of the other of said shafts for clamping said first mentioned shaft to said second shaft at any of a plurality of locations along the latter said shaft with the axis of said first mentioned shaft in any of angularly related radial positions throughout a complete circle around the axis of said second shaft and means operable independently of said clamping members for securing said table in selected positions of rotative adjustment about the axis of said first mentioned shaft.

2. Apparatus for holding one object in any of numerous relationships to another object, comprising a table on which said one object may be mounted, a slide movable along said table to any selected position thereon, a holder for said one object relatively mounted on said slide, means for adjusting said holder on said slide toward and from said table, said holder being also rotatable on said slide about an axis generally perpendicular to the plane of said table, a shaft disposed generally perpendicular to the plane of said table and having the table supported on an end portion thereof for rotational movements about the axis of said shaft, means for releasably securing the table against rotation about the axis of said shaft with the table extending in any of a plurality of angularly related directions radial to the axis of said shaft, a second relatively long shaft having round cross-section supporting the first mentioned shaft and disposed generally at right angles to the latter with one of said shafts extending radially through the other shaft and with the axes of the two said shafts constantly intersecting each other, one of said shafts having clamping means thereon for clamping said first mentioned shaft in supported relation to said second shaft at any of various locations along said second shaft and with the axis of said first mentioned shaft in any of various angularly related radial positions around the axis of said second shaft, said clamping means being operable independently of said releasable table securing means, and means for indicating the amount of angular displacement of the axis of said first mentioned shaft about the axis of said second shaft relative to a predetermined plane.

3. Apparatus for holding one object in any of numerous relationships to another object, comprising a body on which said one object may be mounted, two right-angularly related shafts of which one extends radially through the other and one is supported on the other in generally perpendicular relation thereto with the axes of the two said shafts constantly intersecting each other, said perpendicular shaft having clamping means at one end portion thereof for clamping it to the other shaft at any of various positions therealong with the axis of said perpendicular shaft disposed on any selected extended radius of said other shaft throughout a complete circle around the axis of said other shaft, means supporting said body on the other end of said perpendicular shaft for rotational movements of the body about the axis of said perpendicular shaft, whereby said body is rotatable about the axis of said perpendicular shaft in any position of the latter along and around the axis of said other shaft, and releasable securing means operable independently of said clamping means for securing said body against rotation about the axis of said perpendicular shaft.

4. In a tool holding apparatus a table having tool clamping mechanism thereon, means supporting said table for swinging movements thereof through 360° about one axis and for rotational movements thereof through 360° about another axis and for movements in directions along said one axis, said means comprising a shaft having the table mounted on one end portion thereof for rotational movements about the axis of said shaft, clamping means at the other end of said shaft, a second shaft having round cross-section mounted in a predetermined plane such that said table-supporting shaft is perpendicular thereto, said second shaft having extent through said table-supporting shaft with the axes of the two said shafts constantly intersecting each other, the table-supporting shaft having its said clamping means adapted to be slidably and rotatably engaged with said second shaft whereby the table-supporting shaft may be moved to selected positions along said second shaft and may be swung through 360 degrees about the axis of said second shaft to any selected radial position prior to tightening said clamping means to maintain the table-supporting shaft in a selected position, and means operable independently of said clamping means for releasably securing said table against rotation about the axis of said table-supporting shaft.

5. Apparatus for supporting a tool for adjustments of the tool about first, second and third axes of which said first axis is parallel to said second axis and adjustable along radii of said second axis to either side of the latter, said first and second axes being adjustable in directions along said third axis and swingable about said third axis to selected angular positions, said second and third axes being shafts disposed at right angles to each other with said third axis shaft extending through said second axis shaft and with the axes of said second and third axis shafts constantly intersecting each other, said third axis shaft being cross-sectionally round, a tool support rotatably mounted on the outer end portion of said second axis shaft, the inner end of said second axis shaft having clamping means thereon engaging said third axis shaft whereby said first axis shaft, when said clamping means is loose, can be adjusted along and swung about said third axis shaft, means for tightening said clamping means thereby to secure said first axis shaft in a selected position along and about said third axis shaft, said first axis being on said rotatable tool support for rotational adjustments of a tool on said tool support independently of rotations of said tool support on said second axis shaft.

6. Apparatus for holding one object in any of numerous relationships to another object, comprising a table for supporting said one object, a shaft supporting said table at one end portion of said shaft for rotational movements of the table about the axis of said shaft, the opposite end portion of said shaft having clamping means thereon, a second shaft disposed at right angles to the first mentioned shaft and engaged by said clamping means on the latter said shaft, the axes of the two said shafts constantly intersecting each other, and said clamping means being relatively rotatable on said second shaft whereby said first mentioned shaft may be swung to any of various radial positions about the axis of said second shaft, means for tightening said clamping means thereby to clamp said first mentioned shaft in any selected angular position around said second shaft, indexing means associated with said shafts for determining and indicating the angular position of said first mentioned shaft around said second shaft relative to a predetermined plane, and means operable independently of said clamp tightening means for securing said table against rotation on its supporting shaft.

7. Grinding wheel forming and truing apparatus, comprising a table, a slide movable along said table, a tool mounted on said slide, templet-supporting means fixed relative to said table and adapted to support a templet in the path of movement of said slide in one direction along the table, a stylus member adjustably fixed on said slide in position to engage a said templet, means constantly biasing said slide in said one direction along the table for maintaining said stylus member yieldingly in contact with a said templet, a shaft perpendicular to said table and having said table mounted on its upper end, bearing means at the other end of said shaft, a second shaft cross-sectionally round and disposed generally at right angles to said first-mentioned shaft and to the direction of biased movement of said slide, the axes of said first mentioned and second shafts constantly intersecting each other, said bearing means on said first-mentioned shaft being slidably engaged with said second shaft whereby the first-mentioned shaft is slidably supported on said second shaft, and manually operable means for moving said first-mentioned shaft and the supported table along said second shaft thereby to move said stylus along the said templet and said tool across the peripheral face of a grinding wheel.

8. Grinding wheel forming and truing apparatus, comprising a table, a tool-supporting slide movable along the table, manually operable means engageable at will for manually feeding said slide in either direction along the table, a shaft disposed generally perpendicular to said table and supporting the table for rotational movements about the axis of said shaft, a second shaft cross sectionally round and disposed generally at right angles to the first mentioned shaft, clamping means on said first mentioned shaft for releasably clamping said first mentioned shaft to said second shaft at any of a plurality of locations along the latter said shaft with the axis of said first mentioned shaft in any of a plurality of angularly related radial positions around the axis of said second shaft, a removable templet-carrying plate member mounted on said second shaft and having guide rods thereon for locking said table and said plate member against relative rotation while permitting relative movements of said table and plate in directions along the axis of said second mentioned shaft, and means for manually feeding said first mentioned shaft along said second shaft when said clamping means on said first mentioned shaft is loosened, whereby said tool supporting slide, when its manually operable feed means is disengaged, is biased toward the templet carried by said plate when a grinding wheel is to be formed to a templet in response to movements of said first mentioned shaft along said second shaft.

9. Grinding wheel forming and truing apparatus, comprising a table, a tool-supporting slide movable along the table, manually operable means engageable at will for manually feeding said slide in either direction along the table, a shaft disposed generally perpendicular to said table and supporting the table for rotational movements about the axis of said shaft, a second shaft cross sectionally round and disposed generally at right angles to the first mentioned shaft, clamping means on said first mentioned shaft for releasably clamping said first mentioned shaft to said second shaft at any of a plurality of locations along the latter said shaft with the axis of said first mentioned shaft in any of a plurality of angularly related radial positions around the axis of said second shaft, indexing means for guiding predetermined angular settings of the said tool about the axis of said first mentioned shaft, indexing means for guiding predetermined angular settings of said first mentioned shaft about the axis of said second shaft, and removable means for adapting the apparatus for forming and truing a grinding wheel in conformity with a templet, comprising a templet-carrying plate removably mounted in fixed relation to said table with the templet-carrying portion opposite one end of said tool-supporting slide whereby said slide, when its said feed means is disengaged, is biased along the said table into engagement with the templet, means on said plate for locking said table and said plate against relative rotation, and manually operable means on the said plate for feeding said vertical first mentioned shaft along the second mentioned shaft thereby to move the said table along said fixed templet in directions at right angles to the direction of biased movement of said tool supporting slide on said table.

10. Grinding wheel forming and truing apparatus, comprising a relatively fixed support, a slide adjustable on said support, a shaft mounted on said slide and movable therewith relative to said support, a table-supporting shaft disposed perpendicular to the first mentioned shaft and having clamping means at one end for releasably clamping said perpendicular shaft to said first mentioned shaft in any of various positions along the latter with said perpendicular shaft in any of the various angular positions around said first mentioned shaft, the axes of the two said shafts constantly intersecting each other, a table supported on the other end of said perpendicular shaft and rotatable about the axis of the latter said shaft, means operable independently of said clamping means for securing the table against rotation about the axis of the latter said shaft, a tool-supporting slide movable along said table for setting said tool in various positions relative to the axis of said perpendicular shaft, including setting of the tool to either side of the latter said axis, said tool-supporting slide having tool-holding means thereon, and means for adjusting said tool-holding means toward and from said table and also about an axis perpendicular to said table.

11. Grinding wheel forming and truing apparatus comprising a relatively fixed support, a slide adjustable on said support, a cross-sectionally round shaft mounted on said slide and movable therewith relative to said support, a table-supporting shaft disposed perpendicular to the first mentioned shaft with the axes of the two said shafts constantly intersecting each other, a pair of clamping members relatively movable on one end portion of said perpendicular shaft, means for moving said members relatively into and out of clamping relation to said first mentioned shaft whereby said perpendicular shaft may be clamped in supported relation to said first mentioned shaft with the said perpendicular shaft in any of various positions along the first mentioned shaft with said perpendicular shaft in any of various angular positions around said first mentioned shaft, a table supported on the other end of said perpendicular shaft and rotatable about the axis of the latter said shaft, means operable independently of said clamping members for securing said table against rotation on said perpendicular shaft, adjustable stop means on said table for coaction with an abutment fixed on said shaft-clamping means for predetermining limits of rotational movement of the table about the axis of said perpendicular shaft, and indicating means for indicating the angular displacement of said table when rotated from a starting point to a said predetermined limit of rotational movement thereof.

12. In a grinding wheel forming and truing apparatus, a relatively fixed support, a cross sectionally round shaft mounted on said support, a second shaft having a slot in an end portion thereof through which the first mentioned shaft extends with the axes of the two said shafts constantly intersecting each other, a pair of clamping members slidably and non-rotatably mounted on said slotted portion of said second shaft and disposed on opposite sides of said first mentioned shaft, means on said second shaft for clamping said clamping members to said first mentioned shaft thereby to secure said second shaft to said first mentioned shaft in any of various positions along and around the latter said shaft, a table mounted on the other end of said second shaft for rotational movements about the axis of said second shaft, clamping means for clamping the table to said second shaft, and a tool-supporting slide adjustably mounted on said table and movable along the table the latter said clamping means being operable independently of said clamping members for securing the table against rotation on said second shaft regardless of the condition of said clamping members.

References Cited in the file of this patent

UNITED STATES PATENTS

| | | |
|---|---|---|
| 182,340 | Bergh | Sept. 19, 1876 |
| 523,504 | Armeny | July 24, 1894 |
| 2,067,531 | Indge | Jan. 12, 1937 |
| 2,117,979 | Ogilvie | May 17, 1938 |
| 2,139,938 | Dixon | Dec. 13, 1938 |
| 2,275,496 | Berg | Mar. 10, 1942 |
| 2,335,207 | Flygare | Nov. 23, 1943 |
| 2,356,175 | Olson | Aug. 22, 1944 |
| 2,618,452 | Imhof | Nov. 18, 1952 |

FOREIGN PATENTS

| | | |
|---|---|---|
| 125,512 | Great Britain | Apr. 22, 1919 |
| 223,366 | Switzerland | Dec. 1, 1942 |